United States Patent Office 3,033,825
Patented May 8, 1962

3,033,825
STABLE POLYURETHANE RUBBERS
Walter T. Murphy, Cuyahoga Falls, Ohio, assignor to The B. F. Goodrich Company, New York, N.Y., a corporation of New York
Filed Mar. 26, 1959, Ser. No. 802,202
18 Claims. (Cl. 260—75)

This invention relates to new heat stable polyurethane rubbers and more particularly pertains to stable new polyurethane prepolymer casting mixes containing an alkali metal salt of an organic acid, the heat stable rubbery polyurethanes which result from casting and curing said mixes, and methods for preparing said casting mixes and rubbery polyurethanes.

This is a continuation-in-part of my copending application Serial Number 738,759, filed May 29, 1958, now abandoned.

Figure 1:
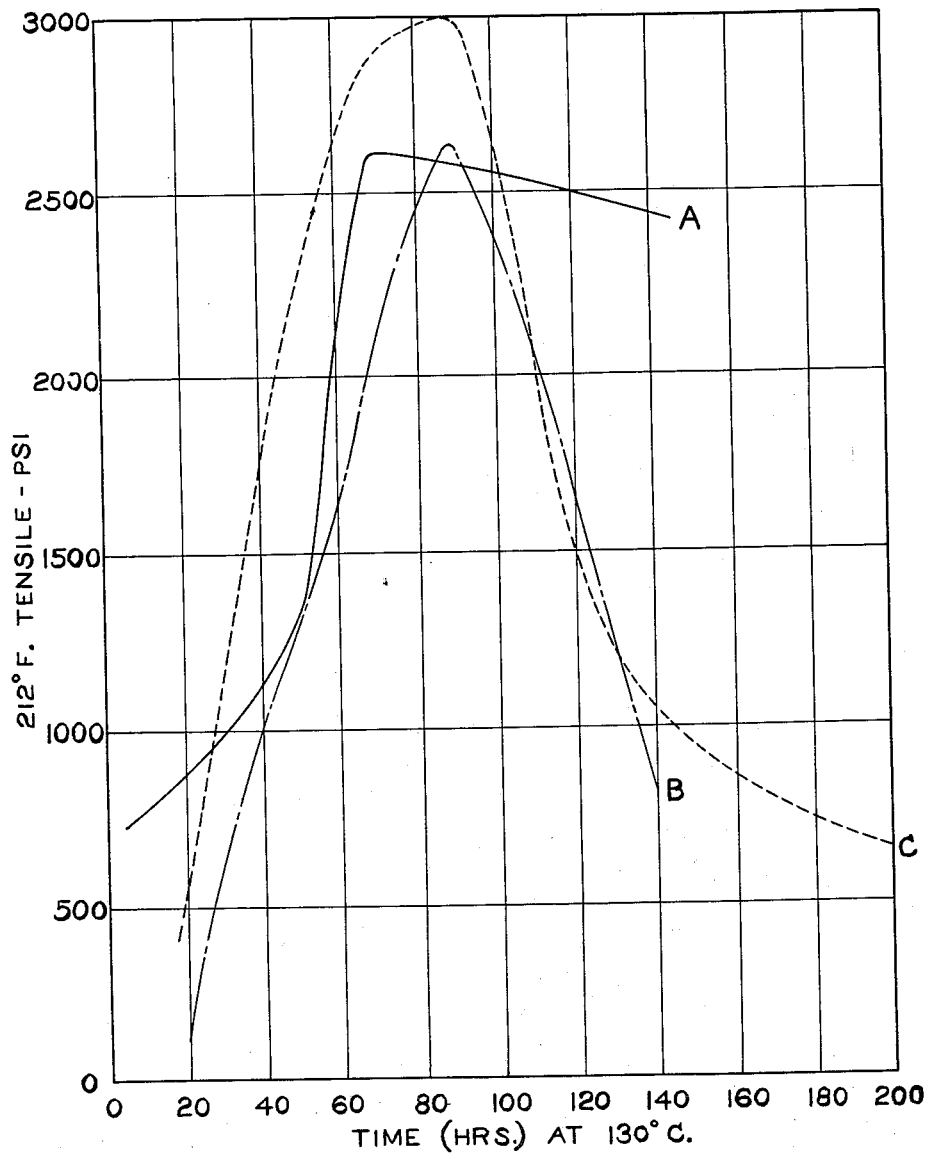
Figure 2:
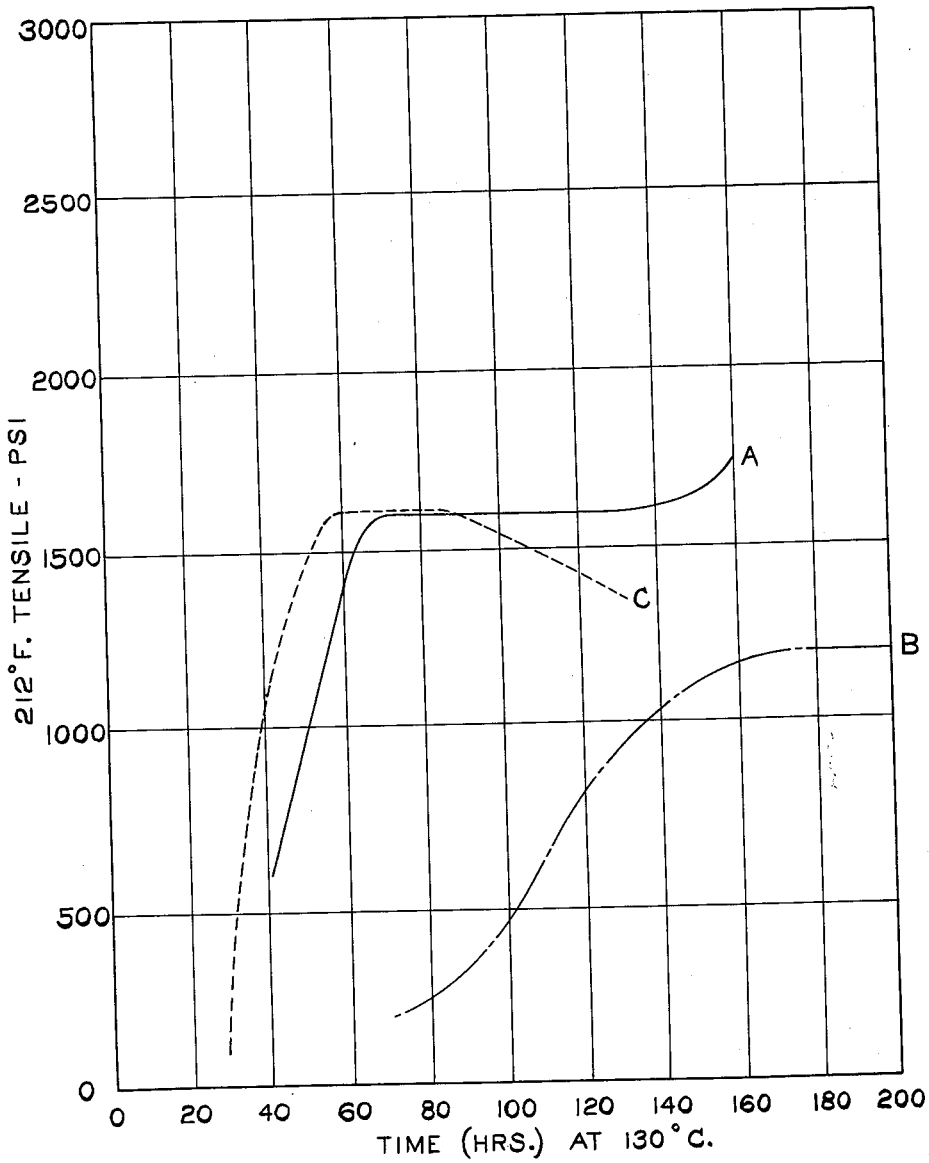

It is known in the art that linear polyurethanes, such as those which result from the treatment of hydroxyl terminated polyesters, polyethers and polyesteramides with an excess of a polyisocyanate to form prepolymers, can be subsequently treated in solution or in the molten state with a polyhydric alcohol and the resulting mixture can be cast in a mold and cured at an elevated temperature in such a manner as to form cured rubbery polymers conforming to the shape of the mold. The diol treated prepolymers often set up before casting in the mold can be accomplished and in the past it has been the practice to add retarding agents to the impure polyester prepolymers in order to stabilize them and the stabilized prepolymerdiol casting mix is then ordinarily treated with metallic organic complex accelerators such as ferric acetyl acetonate, cobaltous acetyl acetonate, zinc acetate, and zinc dimethyl-dithiocarbamate prior to pouring into the mold to give rapid curing rubbers. The rubbery polymers thus formed have a strong tendency to depolymerize or decrease in molecular weight upon prolonged curing or aging at elevated temperatures and their physical properties are not reproducible. Stated differently, the conventional diol-prepolymer casting mixes and the cast rubbery polyurethanes of the aforementioned type are thermally unstable and such a shortcoming limits the scope of their utility. The tendency for the unstabilized prepolymers, and particularly the diol-prepolymer mixes, to set up or gel prematurely can be overcome by removal of traces of cure accelerators from the starting polyester or polyether. However, curve B in FIGURE 2 of the accompanying drawings shows that excessively long periods of time are then required for curing the prepolymer-diol mix without catalyst and when the well-known metallic-organic complexes are used to catalyze the cure there is a strong tendency for the cured rubbery products to depolymerize or decrease in molecular weight on aging at elevated temperatures (FIGURE 1, curves B and C).

Accordingly, an object of the present invention is the provision of new polyurethane rubbers of the cast type which are thermally stable and undergo little or no depolymerization or reversion when aged for prolonged periods of time at elevated temperatures. Another object is the provision of thermally stable polyurethane rubbers having unusually low compression set and hysteresis. Another object is the provision of stable polyurethane rubbers having exceptional resistance to stress relaxation. It is another object of this invention to provide a new liquifiable polyurethane casting composition comprising a pure linear polyurethane as hereinafter defined, a polyfunctional hydroxyl curing agent and a catalytic amount of an alkali metal salt of an organic acid, said casting composition having the ability to cure rapidly at elevated temperatures to thermally stable rubbery polyurethanes having reproducible physical properties. Still another object of this invention is the provision of methods for preparing the aforementioned casting compositions and rubbery polyurethanes. These and other objects and advantages of the present invention will become more apparent to those skilled in the art from the following detailed description and examples.

Reaction products of polymeric diols and organic diisocyanates that are liquid or fluid when warm can be prepared and cast into molds or upon surfaces, so that on further treatment with heat, solid rubber-like products will be formed. The cured rubber-like materials embodied in this invention are obtained by mixing in proper sequence and under appropriate conditions, for example, a hydroxyl terminated polyester and an organic diisocyanate to form a polyesterurethane and while this is still fluid adding a suitable polyfunctional hydroxyl curing agent which contains a catalytic amount of an alkali metal salt of an organic acid and heating the fluid mixture in a mold of any desired shape to effect a cure. There must be a molar excess of the organic diisocyanate over the combined total moles of polymeric diol and the polyfunctional hydroxyl curing agent employed and the excess preferably should vary from between about 0.2 to 0.6 mole. It is also essential for the purposes of this invention that the polymeric diols, such as the hydroxyl terminated polyesters and hydroxyl terminated polyethers, be substantially free from residual catalytic impurities. Polyesters and polyethers which are prepared under carefully controlled conditions in clean equipment are generally suitable for use as starting materials in this invention without further treatment. However, most commercial hydroxyl terminated polyesters and polyethers contain substantial amounts of residual impurities in them which must be removed before they can be used to form the thermally stable prepolymer casting mixes and cured rubbery polyurethanes of this invention. Impure polyesters and polyurethanes are readily purified for use in this invention by thorough water extraction, which is well known in the art, or by treating the polyesters and polyethers with acidic ion exchange resins and inorganic adsorbents.

A simple test is used to distinguish "pure" from the "impure" hydroxyl terminated polyesters and polyethers for the purpose of this invention. One mole of the hydroxyl terminated polyester or polyether to be tested is mixed with 1.7 moles of p-phenylene diisocyanate at 100° C. in a constant temperature bath. The temperature rise of the mixture, caused by the exothermic reaction, is then determined for a period of time. An "impure" polyester or polyether will give a sharp temperature rise which must exceed 110° C. in from about 1 to about 4 minutes after the addition of the diisocyanate and the mixture will often become gelled in from 2 to 8 minutes. A "pure" polyester or polyether will show, following the addition of the diisocyanate, a gradual temperature rise which will never exceed 110° C. and the resulting prepolymer will remain fluid upon prolonged heating at 100° C. The "pure" polyesters and polyethers are useful in this invention, the "impure" polyesters and polyethers are not.

Although the order of addition of the various ingredients can be varied in obvious ways, in the practice of this invention, the preferred procedure is to add the diisocyanate to the molten hydroxyl terminated polymer and to allow all of the hydroxyl groups to react with isocyanate groups, thus forming a linear polyurethane containing free —NCO groups. The resulting product is known as "prepolymer" and it can be stored indefinitely so long as moisture is excluded from it. The polyfunctional hydroxyl curing agent containing a catalytic amount of an alkali metal salt of a carboxylic acid is added to the molten prepolymer and thorough mixing is carried out prior to pouring the casting mix into a mold or onto the surface where the cure is to be effected and preferably the amount of polyfunctional hydroxyl curing agent is adjusted to leave an excess of from about 0.2 to 0.6 mole of free diisocyanate in the mix after complete reaction of said curing agent. Finally, the polyurethane is cured at an elevated temperature to produce a heat-stable polyurethane rubber such as that shown in FIGURE 1, curve A. The preferred quantities employed in the casting mix are one mole of "pure" hydroxyl terminated polymer, more than 1.3 moles and up to about 2.0 moles of organic diisocyanate, from about 0.0002 to about 0.01 part by weight of an alkali metal salt of an organic acid per one-hundred parts by weight of said hydroxyl terminated polymer and between 0.2 and 0.65 mole of polyfunctional hydroxyl curing agent. It is generally preferred to adjust the molar amount of free isocyanate groups in the prepolymer and polyfunctional hydroxyl curing agent in such a fashion that from about 0.4 to 1.2 equivalents of —NCO (expressed as 0.2 to 0.6 mole of diisocyanate) remains after complete reaction of the polyfunctional hydroxyl curing agent with isocyanate in the polymer. The amount of free —NCO in any given prepolymer will vary depending upon the length of time it is stored, the care which is taken to keep it dry and the amount of heating to which it is subjected. The curing temperature may be varied from about 80° C. to about 150° C. with the preferred range being from about 120° C. to 140° C.

The most common polyurethanes are ordinarily prepared by the reaction of a polyester, a polyether glycol or a polyesteramide with a polyisocyanate, especially a diisocyanate of the benzene series. Often other reactive additives such as water and polyhydric alcohols are employed. Typical polyurethanes are described in U.S. Patents 2,620,516, 2,621,166, 2,625,531, 2,625,532, 2,625,535, 2,692,873, 2,692,874, 2,702,797 and 2,753,319. The vulcanized polyurethanes have high tensile strengths, are exceedingly resistant to abrasion, and are resistant to oxidation and many solvents.

The polyurethanes most useful in this invention include the polyesterurethanes and the polyetherurethanes. Most preferred are the polyesterurethanes.

The polyesterurethanes are those high molecular weight products which result when linear polyesters containing reactive hydroxyl end groups, such as those which result from the esterification-condensation of a dicarboxylic acid or its anhydride with an excess of a glycol, are transformed into higher molecular weight polymers by the reaction of their terminal hydroxyl groups with diisocyanates. The aforementioned polyesters which have utility in the present invention are more specifically defined as those which are prepared by the esterification-condensation of at least one type of dicarboxylic acid or its anhydride conforming to the structure

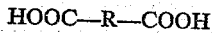

HOOC—R—COOH wherein R represents a divalent hydrocarbon radical having from 1 to 12 carbon atoms. Representative acids of this class include malonic, succinic, glutaric, adipic, pimelic, sebacic, suberic, azelaic, maleic, itaconic, phthalic, terephthalic, and isophthalic and the like with a glycol conforming to the structure HO—$R_1$—OH wherein $R_1$ is a divalent hydrocarbon radical having from 2 to 12 carbon atoms, such glycols including ethylene glycol, propylene glycol, trimethylene glycol, tetramethylene glycol, butenediol, butynediol, pentamethylene glycol, hexamethylene glycol, cyclohexylene glycol, heptamethylene glycol, octamethylene glycol, o-, m-, and p-xylylene glycols and the like and others. The preferred polyesters for the purpose of this invention are those which result from the condensation of adipic, sebacic and phthalic acid with alkylene glycols such as ethylene glycol, propylene glycol, trimethylene glycol, tetramethylene glycol and neopentylene glycol and the most preferred are the polyalkylene adipates.

The polyether glycols useful in this invention are those which are derived from alkylene oxides, glycols or from heterocyclic ethers and they may be represented by the formula $HO(R_2O)_nH$ in which $R_2$ is an alkylene radical having from 2 to 12 carbon atoms and $n$ is a number greater than 1. As is true in the case of the polyesters, it is not necessary that all of the alkylene radicals be the same in a given polymer and polyether glycols containing a mixture of radicals may be employed. Also useful are polyarylene ether glycols in which $R_2$ alone is an arylene radical and polyarylene-alkylene ether glycols such as polyethylene-phenylene ether glycol or mixtures thereof with polyalkylene ether glycols. The preferred polyether glycols are the polyethylene glycols, the polypropylene glycols and the polybutylene glycols.

The molecular weights of the polyester glycols, polyesteramides and polyether glycols embodied in this invention can vary from 150 to 10,000 with the preferred range having the limits of 400 to 4,000. The acid numbers of the polyester glycols and polyesteramides embodied in this invention are always less than 10 and preferably less than 4.

The polyisocyanates which are most useful for producing the polyether and polyesterurethanes and polyesteramideurethanes embodied in this invention are those which conform to the structure OCN—$R_3$—NCO wherein $R_3$ is a divalent hydrocarbon radical having from 2 to 14 carbon atoms. The preferred diisocyanates for the purpose of this invention are the aromatic diisocyanates such as tolylene-2,4-diisocyanate, ortho-, meta- and para-phenylene diisocyanates, naphthalene-1,5-diisocyanate, diphenylmethane-p,p'-diisocyanate and mixtures thereof and the like.

The term "alkali metal salt of an organic acid" as used herein is defined to include compounds conforming to the structure $R_4(COOM)_x$ wherein $R_4$ represents a hydrocarbon radical having from 1 to about 18 carbon atoms, M represents an alkali metal such as lithium, sodium, potassium, rubidium and cesium, and $x$ is a whole number of from 1 to 4. The alkali metal salts of organic acids which conform to the above structure include lithium acetate, sodium acetate, potassium acetate, rubidium acetate, cesium acetate; lithium, sodium and potassium propionate; lithium, sodium and potassium butyrate; the lithium, sodium and potassium isobutyrates; the lithium, sodium and potassium valerates; the lithium, sodium and potassium caproates; the lithium, sodium and potassium heptylates; the lithium, sodium and potassium caprylates, the lithium, sodium and potassium pelargonates; the lithium, sodium and potassium laurates; the lithium, sodium and potassium myristates; the lithium, sodium and potassium palmitates; the lithium, sodium and potassium stearates; the lithium, sodium and potassium oleates; the lithium, sodium, potassium, rubidium and cesium benzoates; the lithium, sodium and potassium toluates; the lithium, sodium and potassium anisates; the lithium, sodium and potassium naphthoates; the lithium, sodium and potassium glutarates; the lithium, sodium and potassium adipates; the lithium, sodium and potassium pimelates; the lithium, sodium and potassium suberates; the lithium, sodium and potassium sebacates; the lithium, sodium and potassium phthalates and mixtures of the aforementioned salts and others.

The term "polyfunctional hydroxyl curing agent" as used herein is defined to mean compounds conforming to the structure $R_5(OH)_y$ wherein $R_5$ represents a hydrocarbon radical having from 3 to 8 carbon atoms and $y$ is a whole number of from 2 to 4, such compounds include propane diols, butane diols, pentane diols, pentane triols, pentane tetrols, hexane diols, triols and tetrols, heptane diols, triols and tetrols, octane diols, triols and tetrols and the like and others. The preferred polyfunctional hydroxyl curing agents for this invention are 1,4-butane diol, 1,3-butane diol, 2,3-butane diol and 1,5-pentane diol.

The heat stable rubbery polyurethanes embodied in this invention have widespread utility for such purposes as encapsulating, pallet rollers, business machine and printing press rollers, rotational castings, potting compounds, shoe heels, tire treads, sheets for packaging and protective purposes, impregnated fibers and fabrics for belting, wearing apparel and household furnishings and the like.

The following examples are given to further illustrate the products and processes of this invention and are not intended to limit the scope of the invention. The amounts of ingredients used in the following examples are expressed as parts by weight unless otherwise indicated.

The hydroxyl terminated polyesters and polyethers may be purified for use in this invention by swirling the melted polymer with successive portions of warm water and decanting the water extract after each treatment as follows:

A 400 g. sample of polyester or polyether is melted in a 1500 ml. Erlenmeyer flask on a greased hot plate. About an equal weight of distilled water which has previously been heated to 70–80° C. is then added to the molten polymer and the mixture is swirled on the hot plate for about 15 minutes. The flask is then removed from the hot plate and the upper (aqueous) layer is decanted from the polymer. The polymer is extracted in the above manner three more times and the resulting polymer is dried for about 20 minutes at 105° C. and 15 mm. followed by about 15 minutes at 105° C. and 5 mm. The polymer which has been treated thusly is ready for use in preparation of the casting mixes and rubbery polyurethanes.

The hydroxyl terminated polyesters and polyethers may alternatively be purified for use in this invention by treatment of the molten polymer with a cation exchange resin of the types disclosed in U.S. Patents 2,340,110, 2,340,111 and 2,471,818 or an inorganic adsorbent such as silica gel or fuller's earth. About 10 parts of a cation exchange resin or an inorganic adsorbent is added to 300 parts of molten polyester and the mixture is stirred vigorously at about 100° C. for from 4 to 16 hours. While the mixture is still hot the resin is removed by filtration and the polyester is ready for use in the following examples.

Example I

A "prepolymer" is prepared by adding 1.7 moles of p-phenylene diisocyanate to one mole of a molten hydroxyl terminated polyethylene adipate having a molecular weight of about 1500 which has been purified by the water extraction method described above and the mixture is stirred for about 30 minutes to an hour at about 100° C. The prepolymer, which must be prepared from substantially anhydrous polyester and diisocyanate under substantially anhydrous conditions, can be stored indefinitely without further reaction providing it is kept free of moisture.

One mole of a pure hydroxyl terminated polyethylene adipate having a molecular weight of about 1421 was treated with 1.7 moles of p-phenylene diisocyanate, 0.45 mole of 1,4-butane diol and 0.0004 part of potassium acetate per 100 parts of polyethylene adipate in the manner described above. The casting mix was degassed, tensile sheets and hysteresis pellets were poured and the polyurethane was cured at 130° C. in molds which were closed to the atmosphere. In two hours the tensile sheets and pellets were strong enough to be removed from the molds. Micro dumbbells were cut from the tensile sheets and the dumbbells were aged at 130° C. in an inert atmosphere. The dumbbells were removed from time to time and 212° F. and stress-strain tests were run on them.

| Aging Time at 130° C. | Shore A Hardness | 212° F. Tensile, p.s.i. |
|---|---|---|
| 24 hrs | 80 | 600 |
| 120 hrs | 78 | 1,640 |

Hysteresis at room temperature on a cured pellet in the Goodrich Flexometer with a 55 pound load and 0.175″ stroke gave a $\Delta T$ of 57° F. with no blowout. A polymer prepared in the same manner with 0.0016 part of potassium acetate per 100 parts of polyester had 212° F. tensiles of 850 and 5500 after 20 and 160 hours at 130° C., respectively.

Example II

The casting mix was prepared by the addition of 0.45 mole of 1,4-butane diol containing 0.0008 gram of potassium acetate per 100 grams of polyester to the molten prepolymer composition described in Example I. The molten casting mix can be poured into a mold or coated on a surface and can be subsequently cured at about 130° C. for from 1 to 1½ hours. The resulting rubbery article has enough strength to be removed from the mold or from the surface upon which it was cast and subjected to further curing at about 130° C. in the manner described in Example I. The stress-strain data for this polymer are given in FIGURE 2 (curve A).

Example III

Figure 3:
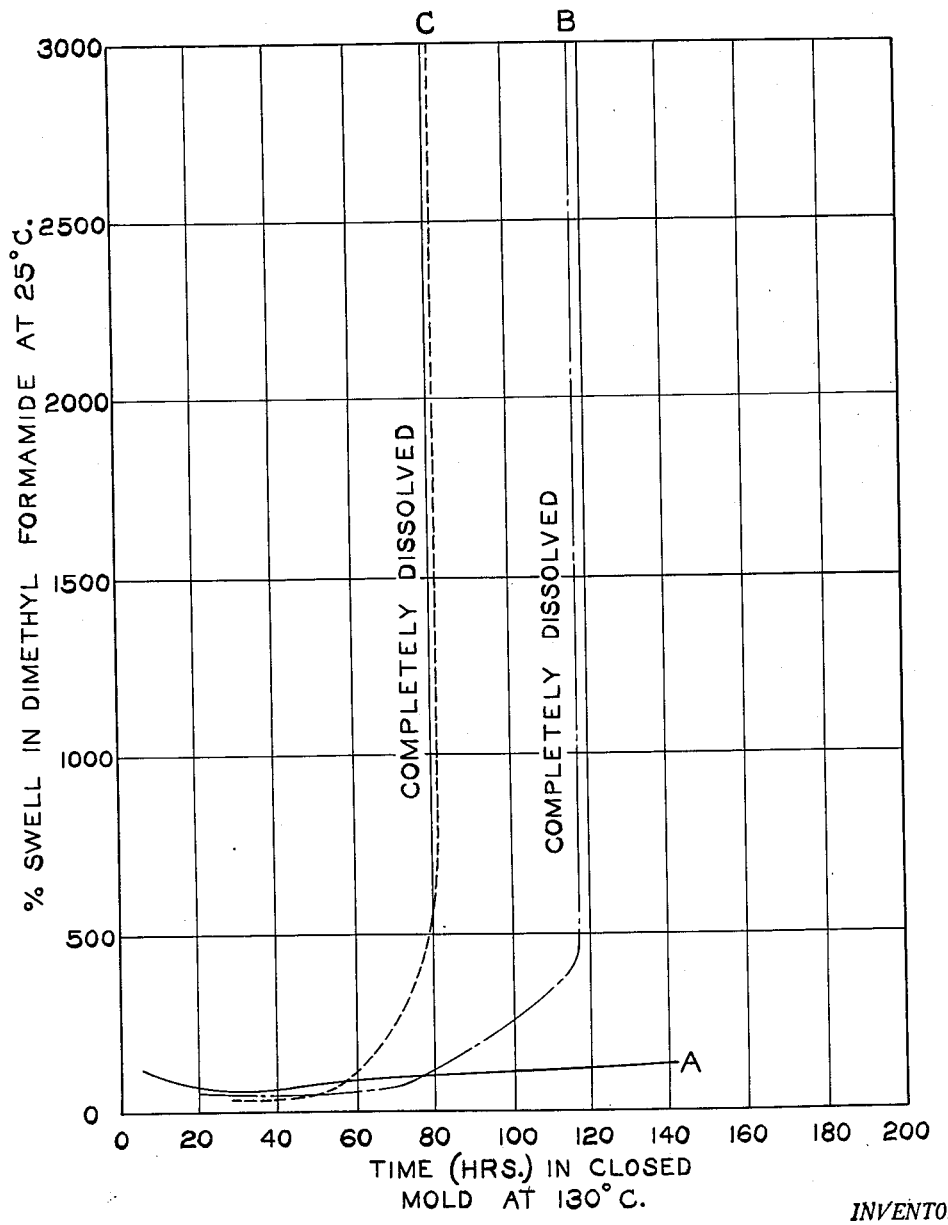

A polymer which was prepared by the procedure described in Example I with 0.0008 part of potassium propionate in place of potassium acetate and the stress-strain data for this polymer is given graphically (curve A) in FIGURE 1 and the swelling characteristic of the aged polymer is shown in FIGURE 3 (also curve A). The compression set test for the cured and aged polymer which was determined after a conditioning period of 22 hours at 158° F. was 16.6%. There was no cure in a reasonable time when 0.0008 or 0.0096 part $Zn(OAc)_2$ was used in place of potassium acetate.

Example IV

The procedures given in Example I were followed with the exception that 0.0002 part of sodium benzoate per 100 parts of polyester was used in place of the potassium acetate. The following data show that the resulting rubbery polyurethane has excellent physical properties and thermal stability.

| Hrs. in Closed Mold at 130° C. | Shore A Hardness | 212° F. Tensile, p.s.i. | Percent Swell in DMF |
|---|---|---|---|
| 21 | 73 | 1,600 | 69 |
| 142 | 68 | 1,900 | 150 |

Example V

A rubbery polyurethane was cast by the procedures given in Examples I and II with the exception that 0.0024 part of potassium sebacate per 100 parts of polyester was used in place of the potassium acetate. The properties of the rubbery polyurethane are as follows:

| Hrs. at 130° C. (Closed Mold) | Shore A Hardness | 212° F. Tensile, p.s.i. | Percent Swell in DMF |
|---|---|---|---|
| 18 | 72 | 600 | 86 |
| 188.5 | 67 | 1,400 | 146 |

Example VI

A rubbery polyurethane was prepared by the procedures described in Example I with the exception that 0.002 part of potassium adipate per 100 parts of polyester was substituted for the potassium acetate. The physical properties of the cured rubbery polyurethane are as follows:

| Hrs. at 130° C. (Closed Mold) | Shore A Hardness | 212° F. Tensile, p.s.i. | Percent Swell in DMF |
|---|---|---|---|
| 16.5 | 77 | 500 | 73 |
| 262.5 | 68 | 1,400 | 120 |

*Example VII*

The procedures described in Example I were used with the exception that 0.0016 part of potassium caprylate per 100 parts of polyester was used in place of the potassium acetate. The cured rubbery polyurethane which resulted had the following physical properties:

| Hrs. at 130° C. (Closed Mold) | Shore A Hardness | 212° F. Tensile, p.s.i. | Percent Swell in DMF |
|---|---|---|---|
| 22 | 75 | 600 | 94 |
| 190.5 | 71 | 2,100 | 162 |

Gehman freeze point −31° C., ΔT 63° F. on the Goodrich Flexometer at room temperature with a 55 pound load and a 0.175″ stroke.

*Example VIII*

The procedures described in Example I were repeated except that 0.0008 part of lithium acetate was used in place of the potassium acetate. The rubbery polyurethane which had been cured at 130° C. for 24 hours had a Shore A hardness of 72, a room temperature tensile of 7200 p.s.i. and a brittle point of −45° C.

*Example IX*

The procedures used in Example I were followed with the exception that 0.45 mole of neopentyl glycol was used in place of 1,4-butane diol. The cured rubbery polyurethane had a room temperature tensile of 3100 p.s.i. at the end of a 48 hour cure cycle at 130° C. in a closed mold.

*Example X*

This example illustrates the physical properties of polyurethane rubbers post cured in the open with the alkali metal organic acid salt catalysts of this invention. A polyurethane rubber was prepared by the procedures described in Example I. The rubber was precured for 18 hours at 130° C. in a closed mold and it was then removed from the mold and the cure was completed at 130° C. in an air oven. The swell property of the cured polymer is shown below.

| Hrs. at 130° C. in Air Oven | Percent Swell in Dimethyl Formamide |
|---|---|
| 20 | 80 |
| 140 | 40 |

The polymers of this invention have unusually good thermal stability when aged in the atmosphere as well as in closed molds. For the purpose of comparing the cast rubbery polyurethanes embodied in this invention with those made with conventional cure catalysts and those made with no catalyst the following experiments were performed.

The procedures of Example I were used with the exception that 0.001 part of copper acetyl acetonate per 100 parts of polyester was used in place of the potassium acetate. The stress-strain curve (B) for this polymer is given in FIGURE 1 and the solubility behavior (curve B) in dimethyl formamide is given in FIGURE 3.

In another comparative test the procedures of Example I were repeated with the exception that 0.004 part of zinc acetyl acetonate per 100 parts of polyester was used in place of potassium acetate. The stress-strain curve (C) for this polymer is given in FIGURE 1. After 20 hours at 130° C. in a closed mold this polymer showed an 80% swell in dimethyl formamide and after 45 hours in a closed mold at 130° C. the polymer dissolved completely in dimethyl formamide which is proof for the complete breakdown of its orginal three-dimensional network.

In a comparative test run without the catalyst the procedures of Example I were followed with the exception that no metallic salt catalyst was used. The rubber could not be removed from the mold until it had aged for 48 hours at 130° C. which fact indicates the slowness of the cure. The stress-strain curve (B) for this polymer is given in FIGURE 2.

A polyurethane rubber was prepared by the methods described in Example I with the exception that 0.0001 part of ferric acetyl acetonate per 100 parts of polyester was used in place of the potassium acetate. The stress-strain curve (C) for this polymer is given in FIGURE 2 and its solubilitiy behavior in dimethyl formamide upon prolonged aging at 130° C. (curve C) is shown in FIGURE 3.

A polyesterurethane rubber was prepared by the procedures given in Example I with the exception that 0.004 part of zinc acetyl acetonate per 100 parts of polyester was used in place of the potassium acetate. This rubber was cured in the mold for 18 hours at 130° C. and the cure was completed at 130° C. in an open air oven. The following solubility behavior was observed for this polymer.

| Hrs. at 130° C. in Air Oven | Percent Swell in Dimethyl Formamide |
|---|---|
| 20 | 80. |
| 45 | Completely soluble. |

The lack of thermal stability of this rubber is obvious when compared with the data in Example X.

*Example XI*

The polyurethane rubbers listed in the following table were prepared by the procedure described in Example I starting with a purified hydroxyl terminated polyethylene adipate having a molecular weight of 2,082. The prepolymers were prepared by the procedure described in Example I and the reaction times at 100° C. used in the preparation of each prepolymer are listed in the following table. The prepolymers were analyzed for free —NCO content (expressed as moles of diisocyanate per mole of hydroxyl terminated polyester) and the quantity of 1,4-butane diol used in each casting mix was that calculated to be just sufficient for reaction with all but 0.25 mole of the free diisocyanate.

| Prepolymer reaction time (100° C.) | A 15 min. | B 30 min. | C 1 hr. | D 1 hr., 45 min. |
|---|---|---|---|---|
| Moles of free diisocyanate found in Prepolymer | 0.715 | 0.638 | 0.6 | 0.502 |
| Moles of 1,4-butane diol | 0.465 | 0.388 | 0.35 | 0.252 |
| Shore A Hardness | 54 | 54 | 54 | 54 |
| Swell in DMF (48 hrs.) | 74 | 74 | 73 | 57 |
| 300% Modulus, p.s.i., 25° C | 200 | 200 | 200 | 200 |
| Tensile, p.s.i., 25° C | 6,500 | 7,000 | 7,200 | 6,900 |
| Percent Elongation, 35° C | 770 | 780 | 750 | 720 |
| Graves Angle Tear, 25° C | 27.5 | 26.0 | 27.0 | 27.5 |
| Compression Set, 22 hrs./158° F | 18.1 | 16.0 | 18.5 | 12.7 |
| Brittle Point, ASTM D746 | −48.5 | −47.5 | −48.5 | −51.0 |
| Goodrich Flexometer at 100° C., 55#, 0.175″ ΔT in 25 min., ° F | 26 | 23 | 27 | 6 |

The excellent heat stability of the polyurethane rubbers A–D is evidenced by the 100° C. flexometer test. Sample D is a particularly good polyurethane rubber exhibiting unusually low hysteresis, compression set and brittle point. The remarkable uniformity in physical properties of A–C is apparent.

The —NCO analysis was carried out by dissolving a known weight of prepolymer in a standardized solution of di-n-butyl amine in chlorobenzene, allowing the amine to react with all of the free —NCO in the prepolymer and titrating the excess amine with standard hydrochloric acid.

*Example XII*

A polyurethane rubber was prepared by the procedure described in Example I. One mole of a purified polyethylene adipate having a molecular weight of 1688 and 2 moles of p-phenylene diisocyanate were used in the prepolymer preparation. The prepolymer which was found by analysis to contain 0.949 mole of free diisocyanate was treated with 0.449 mole of 1,4-butane diol and the mix was cured in the manner described in Example I. The resulting rubber had a Shore A hardness of 68, a room temperature tensile of 7400 p.s.i., Goodrich Flexometer loaded for 15% initial dynamic compression, 0.175″ stroke ΔT of 11° F. in 25 minutes. A permanent set of 0.2% was observed for the Flexometer pellet after the 25 minute run. This rubber in the stress relaxation test at 100° C. and 20% elongation was found to have a half life of 86.7 hours. The half life for a sulfur cured natural rubber black loaded stock under the same conditions was 23.3 hours. The outstanding heat stability of the polyurethane rubber embodied herein is again demonstrated in this example.

Another polyurethane rubber was prepared in the foregoing manner with the exception that 0.649 mole of 1,4-butane diol was employed in the casting mix. The resulting product had a Shore A hardness of 80, a tensile of 8400 p.s.i. at 25° C. and a stress relaxation half life of 166.7 hours at 100° C. and 20% elongation.

*Example XIII*

The procedure of Example I was used in the preparation of the polyurethane rubber of this example. A 1 hour reaction period at 100° C. was used in the preparation of the prepolymer. The prepolymer was found by analysis to contain 0.597 mole of free diisocyanate and 0.247 mole of 1,4-butane diol was used in the casting mix which was calculated to have 0.35 mole of unreacted diisocyanate in the casting mix after complete reaction of the diol had been effected. The polyurethane rubber which resulted had a Shore A hardness of 54, a swell in DMF after 48 hours of 73, a Graves Angle Tear at 25° C. of 22, a ΔT on the Goodrich Flexometer at 100° C. with a 55# load and 0.175″ stroke of 5° F. in 25 minutes and a half life of 51.7 hours in the stress relaxation test at 100° C. and 20% elongation.

Although I have described the invention by reference to polyesters of varying molecular weight it is to be understood that any of the above-described "pure" hydroxyl terminated polyesters can be substituted for polyethylene adipate to obtain heat stable polyurethane polymers by using alkali metal salts of organic acids having from 2 to 18 carbon atoms as curing catalysts. The specific examples are intended merely to describe the invention and are not to be construed as limitations thereon. Thus, replacing the esters of the examples with polyesters of succinic, glutaric, pimelic, sebacic, suberic, azelaic, maleic, itaconic, phthalic, terephthalic and isophthalic acid and a glycol of the formula HO—$R_1$—OH, as defined above, removing the impurities and adding an organic diisocyanate to form a "prepolymer" and then blending a "polyfunctional hydroxyl curing agent" with a catalytic amount of an alkali metal salt of an organic acid having from 2 to 18 carbon atoms and then molding the mixture will provide rapidly cured heat stable articles and coatings.

It is obvious that many changes and modifications can be made in the above-described details without departing from the nature and spirit of my invention. Therefore, it is to be understood that the invention is not limited to said details except as set forth in the appended claims.

I claim:

1. The composition comprising a mixture of the product of reaction under anhydrous conditions of about one mole of a polymeric diol having a molecular weight of from 150 to 10,000 selected from the group consisting of a linear polyester glycol resulting from the esterification-condensation of a dicarboxylic acid with an excess of a glycol said polyester having an acid number of less than 10 and a polyether glycol said polymeric diol being further characterized in that one mole of said polymeric diol will react with 1.7 moles of p-phenylene diisocyanate under anhydrous conditions under a constant 100° C. external source of heat to give a fluid product by an exothermic reaction which never exceeds 110° C. and more than 1.3 moles of an organic diisocyanate with from about 0.0002 to about 0.01 part by weight per one hundred parts by weight of said polymeric diol of the alkali metal salt of an organic acid conforming to the structure $R_4(COOM)_x$ wherein $R_4$ represents a hydrocarbon radical having from 1 to 8 carbon atoms, M represents a non-hydrated alkali metal and $x$ is a whole number of from 1 to 2 and from 0.2 to 0.65 mole of a compound conforming to the structure $R_5(OH)_y$ wherein $R_5$ represents a hydrocarbon radical having from 3 to 8 carbon atoms and $y$ is a whole number of from 2 to 4.

2. The composition comprising a thermally stable rubbery polyurethane which results when the mixture of product of reaction under anhydrous conditions of about one mole of a polymeric diol having a molecular weight of from 150 to 10,000 selected from the group consisting of a linear polyester glycol resulting from the esterification-condensation of a dicarboxylic acid with an excess of a glycol said polyester having an acid number of less than 10 and a polyether glycol said polymeric diol being further characterized in that one mole of said polymeric diol will react with 1.7 moles of p-phenylene diisocyanate under anhydrous conditions under a constant 100° C. external source of heat to give a fluid product by an exothermic reaction which never exceeds 110° C. and more than 1.3 moles of an organic diisocyanate with from about 0.0002 to about 0.01 part by weight per one hundred parts of said polymeric diol of the non-hydrated alkali metal salt of an organic acid conforming to the structure $R_4(COOM)_x$ wherein $R_4$ represents a hydrocarbon radical having from 1 to 8 carbon atoms, M represents an alkali metal and $x$ is a whole number of from 1 to 2 and from 0.2 to 0.65 mole of a compound conforming to the structure $R_5(OH)_y$ wherein $R_5$ represents a hydrocarbon radical having from 3 to 8 carbon atoms and $y$ is a whole number of from 2 to 4 is cured in the substantial absence of moisture at a temperature of from about 120° C. to about 140° C.

3. The composition comprising a thermally stable rubbery polyurethane which results when the mixture of the product of reaction under anhydrous conditions of about one mole of a linear polyester glycol resulting from the esterification-condensation of a dicarboxylic acid with a glycol said polyester glycol having a molecular weight of from 150 to 10,000, being further characterized in that one mole of said polyester glycol will react with 1.7 moles of p-phenylene diisocyanate under anhydrous conditions under a constant 100° C. external source of heat to give a fluid product by an exothermic reaction which never exceeds 110° C. and having an acid number of less than 10 and more than 1.3 moles of an organic diisocyanate with from about 0.0002 to about 0.01 part by weight per one hundred parts by weight of said polyester glycol of the non-hydrated alkali metal salt of an organic acid conforming to the structure $R_4(COOM)_x$ wherein $R_4$ represents a hydrocarbon radical having from 1 to 8 carbon atoms, M represents an alkali metal and $x$ is a whole number of from 1 to 2 and from 0.2 to 0.65 mole of a compound conforming to the structure $R_5(OH)_y$ wherein $R_5$ represents a hydrocarbon radical having from 3 to 8 carbon atoms and $y$ is a whole number of from 2 to 4 is cured in the substantial absence of moisture at a temperature of from about 120° C. to about 140° C.

4. The composition of claim 3 wherein the polyester glycol is the product of reaction of the esterification-condensation of a dicarboxylic acid conforming to the structure HOOC—R—COOH wherein R represents a divalent hydrocarbon radical having from 1 to 12 carbon atoms and a glycol conforming to the structure

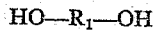

wherein $R_1$ is a divalent hydrocarbon radical having from 2 to 12 carbon atoms.

5. The composition of claim 4 wherein $R_1$ represents an alyklene group having from 2 to 12 carbon atoms.

6. The composition of claim 3 wherein the organic diisocyanate conforms to the structure OCN—$R_3$—NCO wherein $R_3$ represents a divalent hydrocarbon radical having from 2 to 14 carbon atoms.

7. The composition comprising a thermally stable rubbery polyurethane which results when the mixture of the product of reaction under anhydrous conditions of about one mole of a polyester glycol formed by the esterification-condensation of a dicarboxylic acid conforming to the structure HOOC—R—COOH wherein R represents a divalent aliphatic radical having from 4 to 10 carbon atoms and a glycol conforming to the structure HO—$R_1$—OH wherein $R_1$ is an alkylene group having from 2 to 6 carbon atoms said polyester glycol having a molecular weight of from 150 to 10,000 and an acid number less than 10 and being further characterized in that one mole of said polyester glycol will react with 1.7 moles of p-phenylene diisocyanate under anhydrous conditions under a constant 100° C. external source of heat to give a fluid product by an exothermic reaction which never exceeds 110° C. with more than 1.3 moles of an organic diisocyanate conforming to the structure

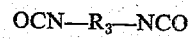

wherein $R_3$ represents an arylene group having from 6 to 10 carbon atoms and from about 0.0002 to about 0.01 part by weight based on one hundred parts by weight of said polyester of the non-hydrated alkali metal salt of an organic acid conforming to the structure $R_4(COOM)_x$ wherein $R_4$ represents a hydrocarbon radical having from 1 to 8 carbon atoms, M represents an alkali metal and $x$ is a whole number of from 1 to 2 and from 0.2 to 0.65 mole of a curing agent conforming to the structure $R_5(OH)_y$ wherein $R_5$ represents an alkyl radical having from 3 to 8 carbon atoms and $y$ is a whole number of from 2 to 4 said composition resulting from curing in the substantial absence of moisture at a temperature of from about 120° C. to about 140° C.

8. The composition of claim 7 wherein R represents an alkylene radical having 4 carbon atoms.

9. The composition of claim 7 wherein R is an alkylene radical having 2 carbon atoms.

10. The composition of claim 7 wherein $R_3$ is an arylene radical having six carbon atoms.

11. The thermally stable rubbery polyurethane which results when the mixture comprising the product of reaction under anhydrous conditions of about one mole of hydroxyl terminated polyethylene adipate having a molecular weight of from 400 to 4,000, an acid number of less than 4 and being further characterized in that one mole of said hydroxyl terminated polyethylene adipate will react with 1.7 moles of p-phenylene diisocyanate under anhydrous conditions under a constant 100° C. external source of heat to give a fluid product by an exothermic reaction which never exceeds 110° C. and from more than 1.3 up to about 2.0 moles of p-phenylene diisocyanate with from about 0.0002 to about 0.01 part by weight per hundred parts by weight of polyethylene adipate of non-hydrated potassium acetate and from about 0.2 to 0.65 mole of 1,4-butanediol is cured in the substantial absence of moisture at about 130° C.

12. The thermally stable rubbery polyurethane which results when the mixture comprising the product of reaction under anhydrous conditions of about one mole of hydroxyl terminated polyethylene adipate having a molecular weight of from 400 to 4,000 and an acid number of less than 4 and being further characterized in that one mole of said hydroxyl terminated polyethylene adipate will react with 1.7 moles of p-phenylene diisocyanate under anhydrous conditions under a constant 100° C. external source of heat to give a fluid product by an exothermic reaction which never exceeds 110° C. and more than 1.3 up to about 2.0 moles of p-phenylene diisocyanate with from about 0.0002 to about 0.01 part by weight per hundred parts by weight of polyethylene adipate of non-hydrated potassium propionate and from about 0.2 to 0.65 mole of 1,4-butanediol is cured in the substantial absence of moisture at about 130° C.

13. The thermally stable polyurethane which results when the mixture comprising the product of reaction under anhydrous conditions of about one mole of a hydroxyl terminated polyethylene adipate having a molecular weight of from 400 to 4,000 and an acid number of less than 4 and being further characterized in that one mole of said hydroxyl terminated polyethylene adipate will react with 1.7 moles of p-phenylene diisocyanate under anhydrous conditions under a constant 100° C. external source of heat to give a fluid product by an exothermic reaction which never exceeds 110° C. and from more than 1.3 up to about 2.0 moles of p-phenylene diisocyanate with from about 0.0002 to about 0.01 part by weight per hundred parts by weight of polyethylene adipate of non-hydrated sodium benzoate and from about 0.2 to 0.65 mole of 1,4-butanediol is cured in the substantial absence of moisture at about 130° C.

14. The thermally stable rubbery polyurethane which results when the mixture comprising the product of reaction under anhydrous conditions of about one mole of hydroxyl terminated polyethylene adipate having a molecular weight of from 400 to 4,000 and an acid number less than 4 being further characterized in that one mole of said hydroxyl terminated polyethylene adipate will react with 1.7 moles of p-phenylene diisocyanate under anhydrous conditions under a constant 100° C. external source of heat to give a fluid product by an exothermic reaction which never exceeds 110° C. and from more than 1.3 up to about 2.0 moles of p-phenylene diisocyanate with from about 0.0002 to about 0.01 part by weight per hundred parts by weight of polyethylene adipate of non-hydrated potassium caprylate and from about 0.2 to 0.65 mole of 1,4-butanediol is cured in the substantial absence of moisture at about 130° C.

15. The thermally stable rubbery polyurethane which results when the mixture comprising the product of reaction under anhydrous conditions of about one mole of hydroxyl terminated polyethylene adipate having a molecular weight of from 400 to 4,000 and an acid number less than 4 being further characterized in that one mole of said hydroxyl terminated polyethylene adipate will react with 1.7 moles of p-phenylene diisocyanate under anhydrous conditions under a constant 100° C. external source of heat to give a fluid product by an exothermic reaction which never exceeds 110° C. and from more than 1.3 up to about 2.0 moles of phenylene diisocyanate with from about 0.0002 to about 0.01 part by weight per hundred parts by weight of polyethylene adipate of non-hydrated potassium sebacate and from about 0.2 to 0.65 mole of 1,4-butanediol is cured in the substantial absence of moisture at about 130° C.

16. The thermally stable polyurethane which results when the mixture comprising the product of reaction under anhydrous conditions of about one mole of hydroxyl terminated polyethylene adipate having a molecular weight of from 400 to 4,000 and an acid number of less than 4 being further characterized in that one mole of said hydroxyl terminated polyethylene adipate will react with 1.7 moles of p-phenylene diisocyanate under anhydrous conditions under a constant 100° C. external source of heat to give a fluid product by an exothermic reaction which never exceeds 110° C. and from more than 1.3 up to about 2.0 moles of p-phenylene diisocyanate with from about 0.0002 to about 0.01 part by weight per hundred parts by weight of polyethylene adipate of non-hydrated lithium acetate and from 0.2 to 0.65 mole of 1,4-butanediol is cured in the substantial absence of moisture at about 130° C.

17. The method for preparing thermally stable polyurethanes comprising mixing the molten polyurethane resulting from the reaction under anhydrous conditions between about one mole of a polymeric diol having a molecular weight of from 150 to 10,000 selected from the group consisting of a linear polyester glycol resulting from the esterification-condensation of a dicarboxylic acid and an excess of a glycol said polyester having an acid number of less than 10 and a polyether glycol said polymeric diol being further characterized in that one mole of said polymeric diol will react with 1.7 moles of p-phenylene diisocyanate under anhydrous conditions under a constant 100° C. external source of heat to give a fluid product by an exothermic reaction which never exceeds 110° C. and more than 1.3 moles of an organic diisocyanate with a solution of from about 0.0002 to about 0.01 part by weight per hundred parts by weight of said polymeric diol of the non-hydrated alkali metal salt of an organic acid conforming to the structure $$R_4(COOM)_x$$

wherein $R_4$ represents a hydrocarbon radical having from 1 to 18 carbon atoms, M represents an alkali metal and $x$ is a whole number of from 1 to 2 in from 0.2 to 0.65 mole of a compound conforming to the structure $R_5(OH)_y$ wherein $R_5$ represents a hydrocarbon radical having from 3 to 8 carbon atoms and $y$ is a whole number of from 2 to 4 and curing the mixture in the substantial absence of moisture at a temperature of from about 120° C. to about 140° C.

18. The method of claim 17 wherein the polymeric diol is polyethylene adipate, the organic diisocyanate is p-phenylene diisocyanate and the temperature is about 130° C.

References Cited in the file of this patent

UNITED STATES PATENTS

| | | |
|---|---|---|
| 2,333,917 | Christ et al. | Nov. 9, 1943 |
| 2,422,271 | Vaala et al. | June 17, 1947 |
| 2,621,166 | Schmidt | Dec. 9, 1952 |
| 2,729,618 | Muller et al. | Jan. 3, 1956 |
| 2,741,800 | Brockway | Apr. 17, 1956 |
| 2,753,319 | Brockway | July 3, 1956 |
| 2,764,565 | Hoppe et al. | Sept. 25, 1956 |
| 2,785,150 | Kreider et al. | Mar. 12, 1957 |
| 2,894,919 | Simon et al. | July 14, 1959 |
| 2,981,700 | Parker et al. | Apr. 25, 1961 |

FOREIGN PATENTS

| | | |
|---|---|---|
| 733,624 | Great Britain | July 13, 1955 |

OTHER REFERENCES

"The Van Nostrand Chemist's Dictionary," D. Van Nostrand Co., Inc., N.Y., 1953, pages 367–8.

UNITED STATES PATENT OFFICE
CERTIFICATE OF CORRECTION

Patent No. 3,033,825            May 8, 1962

Walter T. Murphy

It is hereby certified that error appears in the above numbered patent requiring correction and that the said Letters Patent should read as corrected below.

Column 12, line 68, for "phenylene" read -- p-phenylene --; column 14, line 21, after "Schmidt" insert -- et al. --.

Signed and sealed this 2nd day of April 1963.

(SEAL)
Attest:

ESTON G. JOHNSON                          DAVID L. LADD

Attesting Officer                           Commissioner of Patents